(12) United States Patent
Orr et al.

(10) Patent No.: US 8,576,874 B2
(45) Date of Patent: Nov. 5, 2013

(54) METHODS AND APPARATUS TO PROVIDE A VIRTUAL NETWORK INTERFACE

(75) Inventors: Brian William Orr, San Diego, CA (US); Sapna Mehta, San Diego, CA (US); Mark Maggenti, Del Mar, CA (US); Douglas Marion Crockett, San Diego, CA (US); Amnon Silberger, La Jolla, CA (US); Robert Stacey, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 192 days.

(21) Appl. No.: 12/260,250

(22) Filed: Oct. 29, 2008

(65) Prior Publication Data

US 2009/0175294 A1 Jul. 9, 2009

Related U.S. Application Data

(60) Provisional application No. 60/983,826, filed on Oct. 30, 2007.

(51) Int. Cl.
 *H04L 12/66* (2006.01)
(52) U.S. Cl.
 USPC .......................................................... 370/463
(58) Field of Classification Search
 USPC ......... 370/463, 464, 465, 466, 467, 389, 401, 370/351–356; 709/227, 203, 217; 379/387.02
 See application file for complete search history.

(56) References Cited

U.S. PATENT DOCUMENTS

| | | | | |
|---|---|---|---|---|
| 6,493,430 | B2 * | 12/2002 | Leuca et al. | 379/88.12 |
| 7,003,571 | B1 * | 2/2006 | Zombek et al. | 709/227 |
| 7,352,856 | B2 * | 4/2008 | Matsuhashi et al. | 379/387.02 |
| 7,421,411 | B2 * | 9/2008 | Kontio et al. | 705/52 |
| 7,466,706 | B2 * | 12/2008 | Brown et al. | 370/392 |
| 7,613,112 | B2 * | 11/2009 | Jyske et al. | 370/230 |

(Continued)

FOREIGN PATENT DOCUMENTS

| | | |
|---|---|---|
| TW | 200420071 | 10/2004 |
| WO | WO03045012 A1 | 5/2003 |

OTHER PUBLICATIONS

IPDC in DVB-H: Technical Requirements; CBMS 1026, v1.0.0, Rev. 1/TM 3095 Rev. 2, pp. 1-40.

(Continued)

*Primary Examiner* — Chi Pham
*Assistant Examiner* — Alexander O Boakye
(74) *Attorney, Agent, or Firm* — Charles E. Eggers (57) ABSTRACT

Methods and apparatus to provide a virtual network interface. In an aspect, a method includes receiving a request to access content on a Non-IP network, wherein the request comprises an IP address and a quality of service (QoS) profile associated with the content, mapping the IP address and the QoS profile into a Non-IP network content identifier, and obtaining the content from the Non-IP network based on the Non-IP network content identifier. In an aspect, an apparatus includes an application interface configured to receive a request to access content on a Non-IP network, wherein the request comprises an IP address and a QoS profile associated with the content, mapping logic configured to map the IP address and the QoS profile into a Non-IP network content identifier, and processing logic configured to obtain the content from the Non-IP network based on the Non-IP network content identifier.

25 Claims, 5 Drawing Sheets

(56) References Cited

U.S. PATENT DOCUMENTS

| | | | |
|---|---|---|---|
| 7,660,295 B2 | 2/2010 | Allan et al. | |
| 7,664,501 B2 * | 2/2010 | Dutta et al. | 455/436 |
| 2005/0122938 A1 | 6/2005 | Kim et al. | |
| 2007/0116051 A1 | 5/2007 | Chen | |
| 2007/0160034 A1 * | 7/2007 | Koretsky | 370/352 |

OTHER PUBLICATIONS

Ana Fernandez Vilas et al: "Providing Web Services over DVB-H: Mobile Virtual Web Services" IEEE Transactions on Consumer Electronics, IEEE Service Center, New York, NY, US, vol. 53, No. 2, May 1, 2007, pp. 644-652, XP011186789 ISSN: 0098-3063 Chapter IV,V,VI,VI.A.

International Search Report and Written Opinion—PCT/US2008/081873, International Search Authority—European Patent Office—Apr. 7, 2009.

"Satellite Earth Stations and Systems (SES); Broadband Satellite Multimedia (BSM); Multicast Source Management; ETSI TS 102 461" ETSI Standards, Lis, Sophia Antipolis Cedex, France, vol. SESBSM, No. VI.I.I, Jan. 1, 2007, XP014039802 ISSN: 0000-0001 Annex C.3, C.4.

Taiwan Search Report—TW097141866—TIPO—Dec. 6, 2011.

Victoria Fineberg, Consultant, "QoS Support in MPLS Networks", Frame Relay Forum, May 2003.

Victoria Fineberg, Lucent Technologies, "A Practical Architecture for Implementing End-to-End QoS in an IP Network", IEE Communications Magazine, Jan. 2002.

\* cited by examiner

METHODS AND APPARATUS TO PROVIDE A VIRTUAL NETWORK INTERFACE

CLAIM OF PRIORITY UNDER 35 U.S.C. §119

The present Application for Patent claims priority to Provisional Application No. 60/983,826 entitled "Methods and apparatus for extending the IPDS flow ID to multicast IP address:port mapping to include additional parameters" filed Oct. 30, 2007, and assigned to the assignee hereof and hereby expressly incorporated by reference herein.

BACKGROUND

Multimedia content and other data is typically delivered over a communication network to devices. For example, real time content may include video, audio, closed captioning, overlay information and any other suitable information for rendering on a device. Such networks are typically Internet Protocol (IP) networks that use protocols designed for a wide range of applications and may not provide the most efficiency delivery of certain types of content.

To facilitate the delivery of content, such as real time content, specialized broadcast networks are used where overhead information is minimized and network protocols are implemented that are customized to the task. Thus, these specialized networks are able to deliver content more efficiently than typical IP based networks. For example, in a specialized broadcast network, header information may be reduced or compacted and information may be prioritized so as to increase delivery efficiency, bandwidth utilization, and reduce latency. As a result, these specialized broadcast networks operate to deliver real time content without interruptions or delays to produce a satisfactory user experience.

Unfortunately, such specialized networks may not be compatible with typical IP applications (such as Web browsers) which utilize IP based addressing and other IP protocols to access content. For example, IP applications access content on an IP network using an [address:port] identifier that identifies the location of the content on an IP network. However, these content identifiers may have no meaning in a specialized broadcast network where the protocols have been optimized for content delivery.

Therefore, what is needed is a mechanism for use on a device to allow IP based applications to obtain content in a quick and efficient manner from Non-IP based networks, such as specialized broadcast networks.

SUMMARY

In various aspects, a virtual network interface is provided for use at a device. The virtual network interface operates to allow IP applications executing on the device to obtain content from a Non-IP network to which the device is in communication. For example, the device may be utilizing protocols to communicate with a specialized broadcast network and aspects of the virtual network interface operate to allow an IP application (i.e., Web browser) at the device to obtain content from the specialized network.

In an aspect, a method is provided for a virtual network interface. The method comprises receiving a request to access content on a Non-IP network, wherein the request comprises an IP address and a quality of service (QoS) profile associated with the content, mapping the IP address and the QoS profile into a Non-IP network content identifier, and obtaining the content from the Non-IP network based on the Non-IP network content identifier.

In an aspect, an apparatus is provided for a virtual network interface, the apparatus comprises an application interface configured to receive a request to access content on a Non-IP network, wherein the request comprises an IP address and a QoS profile associated with the content, mapping logic configured to map the IP address and the QoS profile into a Non-IP network content identifier, and processing logic configured to obtain the content from the Non-IP network based on the Non-IP network content identifier.

In an aspect, an apparatus is provided for a virtual network interface. The apparatus comprises means for receiving a request to access content on a Non-IP network, wherein the request comprises an IP address and a QoS profile associated with the content, means for mapping the IP address and the QoS profile into a Non-IP network content identifier, and means for obtaining the content from the Non-IP network based on the Non-IP network content identifier.

In an aspect, a computer program product is provided for providing a virtual network interface. The computer program product comprises a computer-readable medium encoded with codes executable to receive a request to access content on a Non-IP network, wherein the request comprises an IP address and a QoS profile associated with the content, map the IP address and the QoS profile into a Non-IP network content identifier, and obtain the content from the Non-IP network based on the Non-IP network content identifier.

In an aspect, a device for providing a virtual network interface. The device comprises an antenna for receiving content over a Non-IP network and an application interface configured to receive a request to access selected content on the Non-IP network, wherein the request comprises an IP address and a quality of service (QoS) profile associated with the content. The device also comprises mapping logic configured to map the IP address and the QoS profile into a Non-IP network content identifier and processing logic configured to obtain the content from the Non-IP network based on the Non-IP network content identifier.

Other aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following Description when taken in conjunction with the accompanying drawings wherein.

DESCRIPTION

The following description describes aspects of a virtual network interface that operates to allow IP based applications on a device to receive and process content from Non-IP networks. The system is especially well suited for use with devices operating in specialized networks environments, and may be used by devices in any type of network environment, including but not limited to, communication networks, public networks such as broadcast networks, private networks, such as virtual private networks (VPN), local area networks, wide area networks, long haul network, or any other type of data network.

Figure 1:
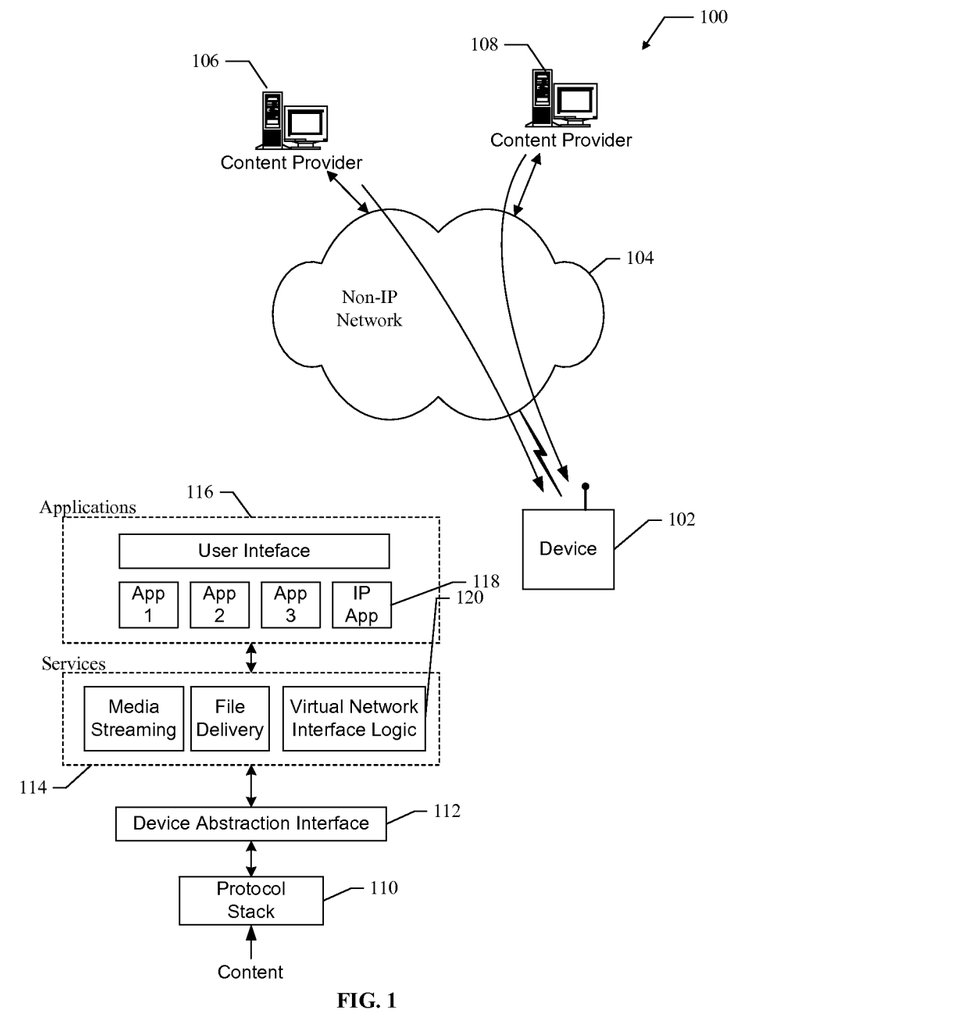
FIG. 1 shows a network that illustrates aspects of a virtual network interface.

FIG. 1 shows a network 100 that illustrates aspects of a virtual network interface. The network 100 comprises a device 102, a Non-IP data network 104 and two content providers (106, 108). For this description, it will be assumed that the Non-IP data network 104 is a network configured to operate under a network protocol that is not an IP based protocol. For example, the network 104 may be a forward link only (FLO) broadcast network that is configured to broadcast a variety of content in an efficient manner. Thus, devices configured to communicate with the FLO network are able to efficiently receive content, such as multimedia content, video clips, advertising content and any other content in an efficient manner by operating under associated FLO protocols. It should be noted that although a FLO network has been identified, the Non-IP network 104 may comprise any other type of Non-IP network.

Two content providers (106, 108) are coupled to the network 104. The content providers 106 and 108 communicate with the network 104 via any suitable communication channel. For example, the communication channel may be a FLO broadcast channel that allows the content providers 106 and 108 to distribute content to devices using the network 104. For example, the content may be real time content, non real time content, data files, programs, applications, or any other type of content.

The device 102 comprises an antenna to communicate with the Non-IP network 104 via a wireless communication link that allows data to be wirelessly transmitted between the network 104 and the device 102. In an aspect, the device 102 comprises a protocol stack 110, a device abstraction interface 112, services 114, and applications 116.

The applications 116 operate to provide functions and features to device users. For example, the applications may render content, process data or perform any other functions useful to a device user. The device user communicates with the applications through a user interface.

The services 114 provide service to the applications. For example, a media streaming service operates to obtain streaming content to satisfy a request from one or more applications. File delivery is another service that may be requested by an application. The services communicate with a device abstraction interface 112 to obtain content to perform the requested service.

The device abstraction interface 112 operates to provide an interface between the services 114 and a protocol stack 110. The device abstraction interface 112 receives requests from the services 114 to obtain content from the protocol stack 110. When the content is received, to the device abstraction interface 112 passes the content to the requesting service.

The protocol stack 110 operates to obtain and store content from a network resource. For example, the protocol stack 110 may interface to a specialized broadcast network and obtain content from that network that is then provided to the device abstraction interface 112.

For this description, it will be assumed that a device is currently in communication with a Non-IP network, such as a FLO broadcast network. During operation, an IP application 118 at the device is activated by a user through the user interface. The IP application 118 functions to obtain and process content from an IP network resource. The IP application 118 operates to communicate with a virtual network interface 120 that is part of the services 114 to obtain content from the Non-IP network. The IP application 118 provides an IP address and QoS profile to the virtual network interface logic 120. The virtual network interface operates to map the IP address of the content and QoS profile to a network address associated with the content in the Non-IP network. The QoS profile indicates what type of kind of content is being requested. A more detailed description of the mapping algorithm is provided in another section of this document.

Once the mapped address is determined, the virtual network interface logic 120 operates to communicate the Non-IP network content identifier to the device abstraction interface 112, which in turn, communicates with the protocol stack 110 to obtain the content. The protocol stack 110 then provides the content to the device abstraction interface 112, which passes the content to the virtual network interface logic 120. The virtual network interface logic 120 re-packages the content into an IP protocol. For example, IP headers and associated information are added to re-package the content into IP protocols. The virtual network interface logic 120 then passes the re-packaged content to the IP application 118. Thus, the IP application 118 is able to obtain content from the Non-IP network and process that content for presentation to the device user.

Overview of Virtual Network Interface

The virtual network interface (VNI) is an interface that makes a Non-IP network appear as an IP network to a device's native operating system. In an aspect, the VNI allows an IP application to use the Non-IP platform and hardware layers as an IP delivery system. Such an IP application can then open a socket and receive data without any specific knowledge about the underlying Non-IP network. For example, an IP application needing to receive IP content initiates reception of the content by opening a UDP socket, binding the socket to a Port, selecting the VNI, and issuing an Add Multicast Membership Set Sockets Option. A QoS profile of the requested content is also provided. To stop reception of the content, the application selects the VNI and drops the multicast IP address membership via Set Sockets Option.

Upon receiving the Add/Remove Multicast IP Address Membership command, the VNI uses a mapping algorithm described below to determine the Non-IP network content identifier corresponding to the multicast IP [Address:Port]. If the multicast IP [Address:Port] maps to a particular Non-IP network content identifier, the VNI conveys a successful status back up the socket. Otherwise, the VNI returns a failure status back up the socket.

Upon accepting an Add Multicast Membership (i.e., sending a successful status back up the socket), the VNI communicates over the device abstraction interface 112 to obtain the corresponding content. In an aspect, there may be multiple applications interested in the same content. Each interested application can open a UDP socket, bind to a Port and join the multicast to receive the content. The UDP/IP stack ensures that each interested socket (i.e., application) receives the multicast UDP/IP packets. To support this scenario, the VNI will only communicate with the device abstraction interface to deactivate a content flow if there are no UDP sockets (i.e., applications) interested in receiving the content. This prevents a content flow from being deactivated when an application issues a Drop Multicast Membership Set Socket Option while there are other applications still interested in receiving the content flow.

In various aspects, VNI operates to perform one or more of the following operations.

1. Upon reception of an Add/Drop Multicast IP Address Membership Set Socket Option command through a UDP socket, the VNI utilizes a mapping algorithm described below to determine the Non-IP network content identifier corresponding to the multicast IP [Address:Port] and associated QoS profile.
2. The VNIC returns a success status for the received Add/Drop Multicast IP Address Membership Set Socket Option command if the multicast IP [Address:Port] maps to a Non-IP network content identifier.
3. The VNIC returns a failure status for the received Add/Drop Multicast IP Address Membership Set Socket Option command if the multicast IP [Address:Port] does not map to a Non-IP network content identifier.
4. Upon returning a successful status for an Add Multicast Membership Set Socket Option command, the VNI communicates the mapped content identifier to the device abstraction interface 112 to obtain the desired content.
5. The obtained content is then re-packages into IP protocols for delivery to the requesting IP applications.

Figure 2:
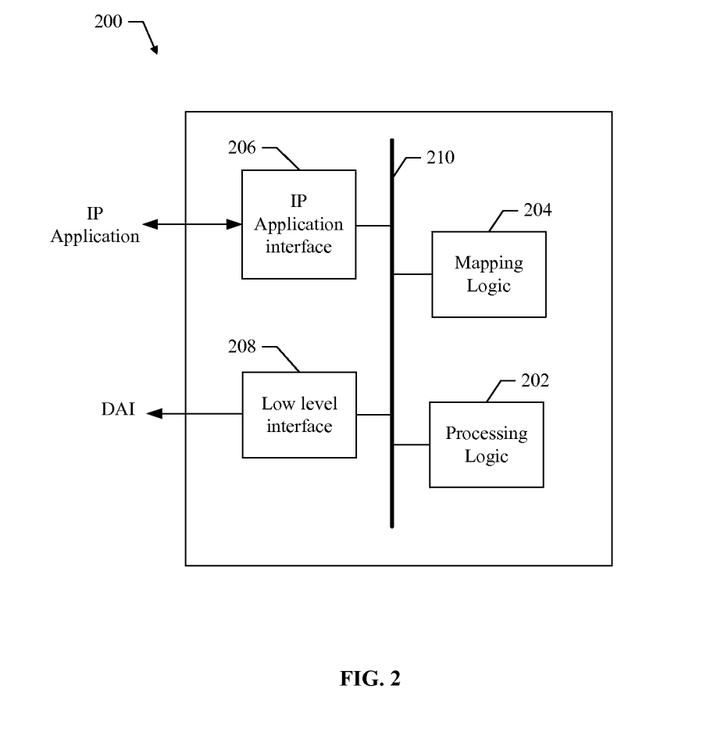
FIG. 2 shows exemplary virtual network interface logic for use in aspects of a virtual network interface.

FIG. 2 shows exemplary virtual network interface logic 200 for use in aspects of a virtual network interface. For example, the virtual network interface logic 200 is suitable for use as the virtual network interface logic 120 shown in FIG. 1. The virtual network interface logic 200 comprises processing logic 202, mapping logic 204, IP application interface 206, and low level interface 208, all coupled to a data bus 210.

In various aspects, the processing logic 202 comprises at least one of a CPU, processor, gate array, hardware logic, memory elements, virtual machine, and/or hardware executing software. Thus, the processing logic 202 generally comprises logic to execute machine-readable instructions to control one or more functional elements of the virtual network interface logic 200 via the data bus 210.

The IP application interface 206 comprises hardware and/or hardware executing software that operates to receive requests for content from IP based applications executing at a device. A request for content comprises an IP address and associated QoS profile which is passed to the mapping logic 204 where it is mapped to an address of the Non-IP network to which the device is currently in communication. In an aspect, content obtained for delivery to a requesting IP application passes through the IP application interface 206 where is it re-packaged to have IP protocols. For example, the IP application interface 206 operates to add header and any other information necessary to re-package the content into IP format.

The mapping logic 204 comprises hardware and/or hardware executing software that operates to perform a mapping algorithm to map IP based addresses and associated QoS profiles to Non-IP network addresses. For example, IP based addresses that are used to identify content by IP based applications are mapped to Non-IP network addresses by the mapping algorithm performed by the mapping logic 204. A more detailed description of the mapping algorithm is provided in another section of this document. The mapping logic 204 passes the mapped Non-IP network content address to the processing logic 202. The processing logic 202 operates to pass the mapped Non-IP network content address in a content request to the low level interface 208.

The low level interface 208 comprises hardware and/or hardware executing software that operates to communicate with a device abstraction interface to obtain content associated with the Mapped Non-IP network address. For example, the processing logic 202 operates to control the low level interface 208 to request content from the device abstraction interface. The request includes the mapped Non-IP network address mapped by the mapping logic 204. In an aspect, the device abstraction interface communicates the mapped Non-IP network address to a protocol stack which responds by providing the requested content. The content is then passed to the low level interface 208.

The content is passed to the IP application interface 206 which operates to add header information to re-package the content based on IP protocols. Once repackaged, the content is sent from the IP application interface 206 to the requesting IP application.

In various aspects, the virtual network interface comprises a computer program product having one or more program instructions ("instructions") or sets of "codes" stored or embodied on a machine-readable medium. When the codes are executed by at least one processor, for instance, a processor at the processing logic 202, their execution causes the virtual network interface logic 200 to provide the functions of the virtual network interface described herein. For example, the machine-readable medium comprises a floppy disk, CDROM, memory card, FLASH memory device, RAM, ROM, or any other type of memory device or machine-readable medium that interfaces to virtual network interface logic 200. In another aspect, the sets of codes may be downloaded into the virtual network interface logic 200 from an external device or communication network resource. The sets of codes, when executed, cause the virtual network interface logic 200 to provide aspects of a virtual network interface as described herein.

Figure 3:
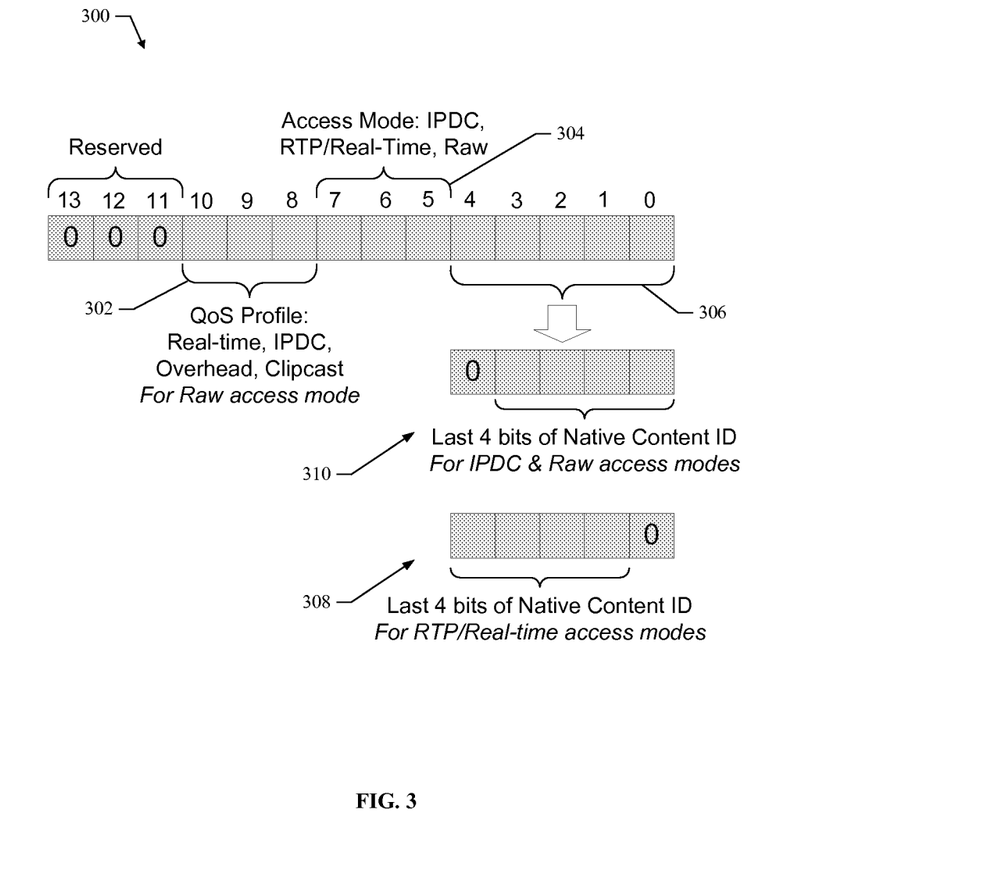
FIG. 3 shows an exemplary Non-IP network content identifier that illustrates the operation of a mapping algorithm in aspects of a virtual network interface.

FIG. 3 shows an exemplary Non-IP network content identifier 300 that illustrates the operation of a mapping algorithm in aspects of a virtual network interface. For example, the mapping algorithm operates to map IP addresses to Non-IP network content identifiers for use in aspects of a virtual network interface. In an aspect, the mapping algorithm is implemented by the mapping logic 204 shown in FIG. 2.

In one or more aspects, the content identifier 300 comprises a QoS profile portion 302, an access mode portion 304, and a native content identifier portion 306.

In an example of the operation of the mapping algorithm, an IP address provided as [Address:Port] is mapped to a Non-IP network content identifier. For example, in an aspect, the mapping algorithm determines a Non-IP network content identifier for a multi-cast IP [Address:Port] associated with content having a QoS profile indicating an IP data cast (IPDC). In this example, the mapping algorithm determines the mapped Non-IP content identifier as follows.

IP multicast address=239.192.0.0+first 16 bits of Non-IP content identifier

Port=49152+last 4 bits of Non-IP network content identifier

Dynamic Port Address range is 49152 to 65535.

In an aspect, the mapping algorithm shown above only uses Ports 49152 to 49167. There are actually 49152 to 65535=14-bits of Port range available to use to indicate the last 4-bits of the Non-IP content identifier and additional content access parameters.

Table 1 illustrates access mode 304 bit mappings that indicate a particular content type.

TABLE 1

| Bit 7 | Bit 6 | Bit 5 | Access Mode |
|-------|-------|-------|-------------|
| 0 | 0 | 0 | IPDC |
| 0 | 0 | 1 | RTP - Real-time |
| 0 | 1 | 0 | Raw |
| 0 | 1 | 1 | Reserved for future access modes. |
| ... | ... | ... | Reserved for future access modes. |
| 1 | 1 | 1 | Reserved for future access modes. |

In an aspect, the RTP access mode utilizes an even port address. Therefore, 5-bits of the 14 available port bits are used to indicate the last 4 bits of Non-IP content identifier. As a result, 9-bits are left to indicate content access parameters.

As illustrated, if the access mode 304 indicates RTP, bit 0 of the portion 306 is always set to 0 and bits 1-4 include last 4-bits of the content identifier in the Non-IP network, as indicated at 308. If the access mode 304 indicates IPDC or Raw, bit 4 of the portion 306 is set to 0 and bits 0-3 include last 4 bits of the content identifier in the Non-IP network, as indicated at 310.

Table 2 illustrates the bit definitions for the QoS profile portion 302. For raw access mode, bits 8-10 are used to indicate a QoS profile to determine priority, buffer utilization, and other functions by the virtual network interface.

TABLE 2

| Bit 10 | Bit 9 | Bit 8 | QoS Profile for raw access mode |
|---|---|---|---|
| 0 | 0 | 0 | IPDC |
| 0 | 0 | 1 | Clipcast |
| 0 | 1 | 0 | Overhead |
| 0 | 1 | 1 | Real-Time |
| 1 | 0 | 0 | Reserved for future QoS profiles. |
| ... | ... | ... | Reserved for future QoS profiles. |
| 1 | 1 | 1 | Reserved for future QoS profiles. |

Figure 4:
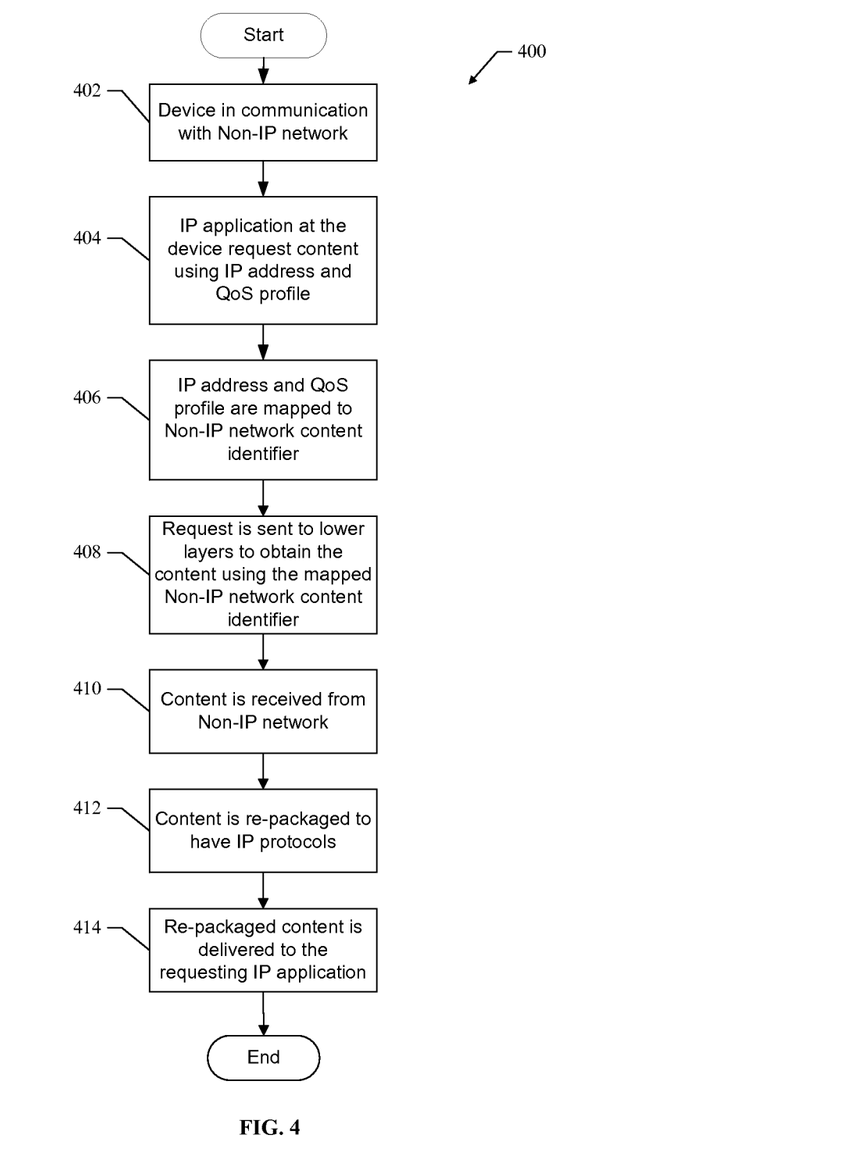
FIG. 4 shows an exemplary method for providing aspects of a virtual network interface.

FIG. 4 shows an exemplary method 400 for providing aspects of a virtual network interface. For clarity, the method 400 will be described with reference to the virtual interface logic 200 shown in FIG. 2. In one or more aspects, the processing logic 202 executes one or more program instructions or sets of codes to perform the functions described below.

At block 402, a device is in communication with a Non-IP network. For example, the device may be in communication with a specialized FLO broadcast network.

At block 404, an IP application at the device requests to obtain content by providing an IP address and QoS profile. In an aspect, the IP application communicates with the IP application interface 206 and provides an IP address and QoS profile of the content it desires to receive.

At block 406, the IP address and QoS profile are mapped to a Non-IP network content identifier. In an aspect, the mapping logic 204 operates to perform the mapping algorithm described above to map the IP address and QoS profile to the Non-IP content identifier.

At block 408, a request is sent to lower layers at the device to obtain the content identified by the mapped Non-IP content identifier. In an aspect, the processing logic 202 controls the low level interface 208 to request the content from a device abstraction interface, such as the device abstraction interface 112 shown in FIG. 1.

At block 410, the requested content identified by the mapped Non-IP content identifier is obtained. In an aspect, the device abstraction interface 112 obtains the content from the protocol stack 110 and returns the content to the low level interface 208. The low level interface 208 passes the received content to the IP application interface 206.

At block 412, the content is repackaged into IP protocols. In an aspect the IP application interface operates to add headers and perform other processing to re-package the received content to have the appropriate IP protocols.

At block 414, the re-packaged content is delivered to the requesting IP application. In an aspect, the IP application interface 206 delivers the re-packaged content to the requesting IP application.

It should be noted that the method 400 illustrates just one aspect and that changes, additions, or rearrangements of the operations described above may be made without deviating from the spirit and scope of the various aspects.

Figure 5:
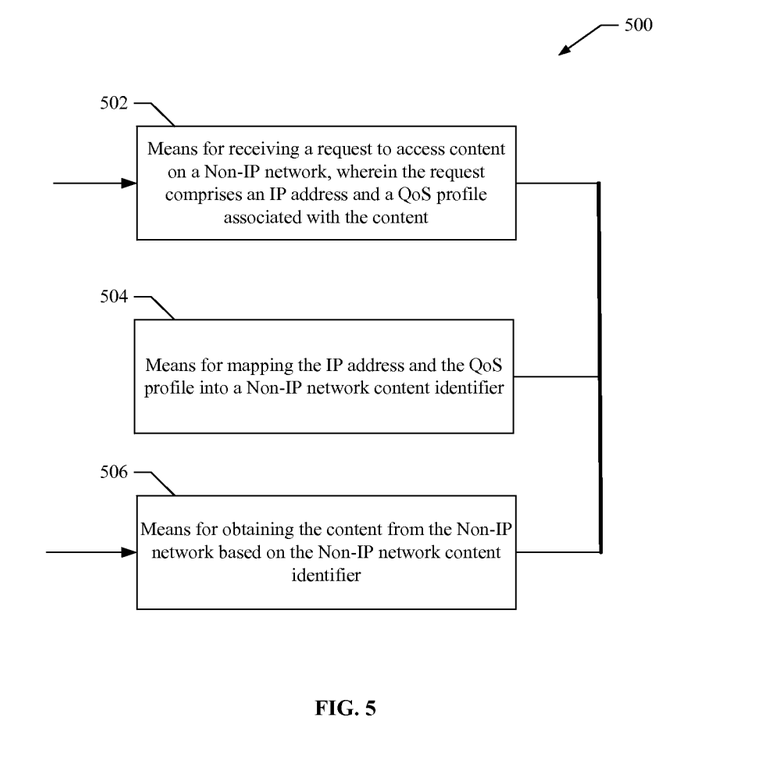
FIG. 5 shows exemplary virtual network interface logic.

FIG. 5 shows exemplary virtual network interface logic 500 for use in aspects of a virtual network interface. In an aspect, the virtual network interface logic 500 is implemented by at least one processor or integrated circuit comprising one or more modules configured to provide aspects of a virtual network interface as described herein. For example, each module comprises hardware and/or hardware executing software.

The virtual network interface logic 500 comprises a first module that comprises means 502 for receiving a request to access content on a Non-IP network, wherein the request comprises an IP address and a QoS profile associated with the content. For example, in an aspect, the means 502 comprises the IP application interface 206. The virtual network interface logic 500 comprises a second module that comprises means 504 for mapping the IP address and the QoS profile into a Non-IP network content identifier. For example, in an aspect, the means 504 comprises the mapping logic 204. The virtual network interface logic 500 also comprises a third module that comprises means 506 for obtaining the content from the Non-IP network based on the Non-IP network content identifier. For example, in an aspect, the means 506 comprises the processing logic 202.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of a virtual network interface have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

We claim:

1. A method for providing a virtual network interface, comprising: receiving a request to access content on a non-internet protocol (IP) network, wherein the request comprises an IP address and a quality of service (QoS) profile associated with the content; mapping the IP address and the QoS profile to an identifier of the content in a non-IP network; wirelessly obtaining the content from the non-IP network, based on the identifier; re-packaging the content into an IP protocol; and sending the re-packaged content to a requesting IP application.

2. The method of claim 1, wherein the mapping comprises generating the identifier, and the identifier includes at least one of a QoS profile portion, an access mode portion, and a native content identifier portion.

3. The method of claim 1, wherein the QoS profile is configured to identify at least one of real time content, IP datacast content, clip cast content, and overhead content.

4. The method of claim 1, wherein the receiving comprises receiving the request from an IP application.

5. The method of claim 1, wherein the obtaining further comprises sending the identifier to a device abstraction interface.

6. The method of claim 1, wherein the non-IP network is a forward link only (FLO) broadcast network.

7. The method of claim 6, wherein the content is wirelessly obtained via a FLO broadcast channel.

8. The method of claim 1, wherein the content is advertising content.

9. The method of claim 1, wherein the identifier includes a network address that is not in an IP format.

10. An apparatus for providing a virtual network interface, comprising: an application interface configured to receive a request to access content on a non-internet protocol (IP) network, wherein the request comprises an IP address and a quality of service (QoS) profile associated with the content; mapping logic configured to map the IP address and the QoS profile to an identifier of the content in a non-IP network; processing logic configured to wirelessly obtain the content from the non-IP network based on the identifier; and memory configured to store, at least temporarily, the Non IP network content identifier; wherein the application interface is configured to: re-package the content into an IP protocol; and send the re-packaged content to a requesting IP application.

11. The apparatus of claim 10, wherein the mapping logic is configured to generate the identifier, and the identifier includes at least one of a QoS profile portion, an access mode portion, and a native content identifier portion.

12. The apparatus of claim 10, wherein the QoS profile is configured to identify at least one of real time content, IP datacast content, clip cast content, and overhead content.

13. The apparatus of claim 10, wherein the application interface is configured to receive the request from an IP application.

14. The apparatus of claim 10, wherein the processing logic is configured to send the identifier to a device abstraction interface.

15. The apparatus of claim 10, wherein the non-IP network is a forward link only (FLO) broadcast network.

16. The apparatus of claim 15, wherein the processing logic is coupled to a FLO broadcast channel configured to transport the content.

17. The apparatus of claim 10, wherein the content is advertising content.

18. An apparatus for providing a virtual network interface, comprising: means for receiving a request to access content on a non-internet protocol (IP) network, wherein the request comprises an IP address and a quality of service (QoS) profile associated with the content; means for mapping the IP address and the QoS profile to an identifier of the content in a non-IP network; and means for wirelessly obtaining the content from the non-IP network, based on the identifier; means for re-packaging the content into an IP protocol; and means for sending the re-packaged content to a requesting IP application.

19. The apparatus of claim 18, wherein the means for mapping comprises means for generating the identifier, and the identifier includes at least one of a QoS profile portion, an access mode portion, and a native content identifier portion.

20. The apparatus of claim 18, wherein the QoS profile is configured to identify at least one of real time content, IP datacast content, clip cast content, and overhead content.

21. The apparatus of claim 18, wherein the means for receiving comprises means for receiving the request from an IP application.

22. The apparatus of claim 18, wherein the means for obtaining further comprises means for sending the identifier to a device abstraction interface.

23. The apparatus of claim 18, wherein the non-IP network is a forward link only (FLO) broadcast network.

24. A computer program product for providing a virtual network interface, comprising:
   a non-transitory computer-readable medium encoded with codes executable to:
   receive a request to access content on a non-internet protocol (IP) network, wherein the request comprises an IP address and a quality of service (QoS) profile associated with the content;
   map the IP address and the QoS profile to an identifier of the content in a non-IP network; and
   obtain the content from the non-IP network based on the identifier.

25. A device for providing a virtual network interface, comprising:
   an antenna configured to receive content over a non-internet protocol (IP) network;
   an application interface configured to receive a request to access selected content on the non-IP network, wherein the request comprises an IP address and a quality of service (QoS) profile associated with the content;
   mapping logic configured to map the IP address and the QoS profile to an identifier of the content in a non-IP network; and
   processing logic configured to obtain the content from the non-IP network, based on the identifier.

* * * * *